（12) United States Patent
Sakamaki et al.

(10) Patent No.: US 9,626,820 B2
(45) Date of Patent: Apr. 18, 2017

(54) CARD READER

(71) Applicant: NIDEC SANKYO CORPORATION, Suwa-gun, Nagano (JP)

(72) Inventors: Hirotaka Sakamaki, Nagano (JP); Yukihiko Takita, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 15/123,824

(22) PCT Filed: Mar. 5, 2015

(86) PCT No.: PCT/JP2015/056482
§ 371 (c)(1),
(2) Date: Sep. 6, 2016

(87) PCT Pub. No.: WO2015/133567
PCT Pub. Date: Sep. 11, 2015

(65) Prior Publication Data
US 2017/0018135 A1    Jan. 19, 2017

(30) Foreign Application Priority Data
Mar. 6, 2014    (JP) .................................. 2014-044215

(51) Int. Cl.
G07F 7/08    (2006.01)
G06K 7/08    (2006.01)
G07F 19/00    (2006.01)

(52) U.S. Cl.
CPC ........... *G07F 7/0873* (2013.01); *G06K 7/087* (2013.01); *G07F 19/2055* (2013.01)

(58) Field of Classification Search
None
See application file for complete search history.

(56) References Cited

U.S. PATENT DOCUMENTS

| 6,629,643 B1* | 10/2003 | Nagata | G06K 7/084 235/475 |
| 2007/0131768 A1* | 6/2007 | Wakabayashi | G06K 7/084 235/449 |
| 2011/0135092 A1 | 6/2011 | Lehner | |

FOREIGN PATENT DOCUMENTS

| JP | 2001067524 A | 3/2001 |
| JP | 2007164533 A | 6/2007 |

(Continued)

OTHER PUBLICATIONS

International Search Report corresponding to Application No. PCT/JP2015/056482; Date of Mailing: May 19, 2015, with English translation.

*Primary Examiner* — Kristy A Haupt
(74) *Attorney, Agent, or Firm* — Cantor Colburn LLP

(57) ABSTRACT

A card reader may include a card insertion port; a card passage; and a disturbing magnetic field generator. The disturbing magnetic field generator may include a core part including a core formed and a disturbing magnetic field generation coil wound around the core. The core part may include a first end face and a second end face which are disposed so as to face substantially the front side. The disturbing magnetic field generator may generate a disturbing magnetic field whose flux line changes into a direction from the first end face toward the second end face and a direction from the second end face toward the first end face. The direction of the magnetic flux lines are substantially parallel to the passing direction of the card. In a width and thickness direction of the card, the magnetic flux line crosses a position where the magnetic stripe is passed.

16 Claims, 7 Drawing Sheets

(56) References Cited

FOREIGN PATENT DOCUMENTS

| JP | 2010027072 A | 2/2010 |
|----|--------------|--------|
| JP | 2013012022 A | 1/2013 |

* cited by examiner

Fig. 8
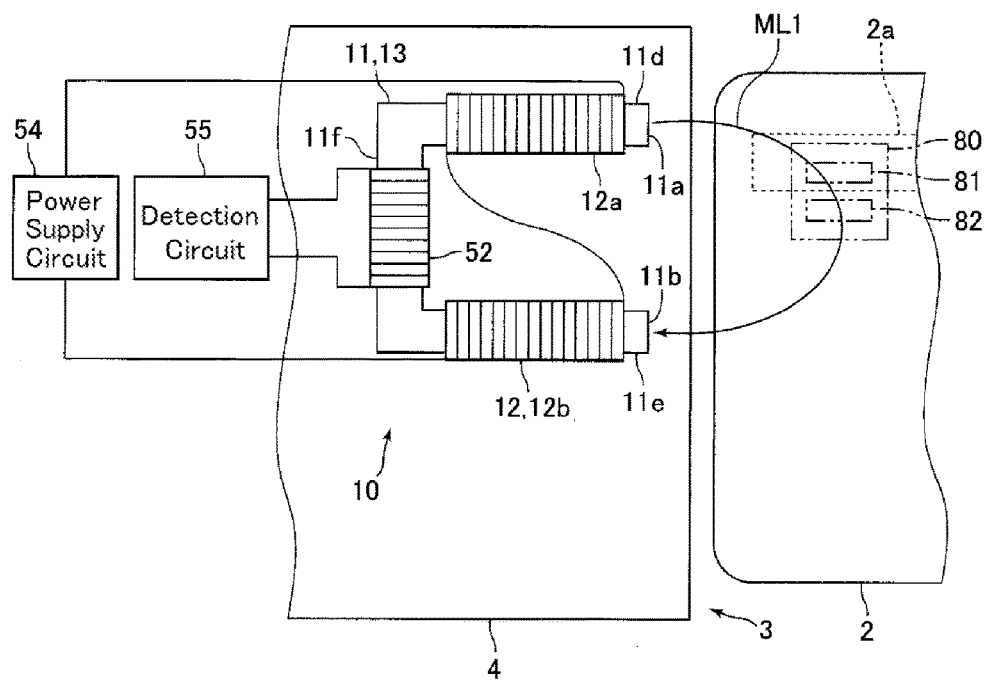
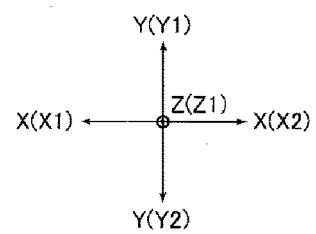
Fig. 9(A)
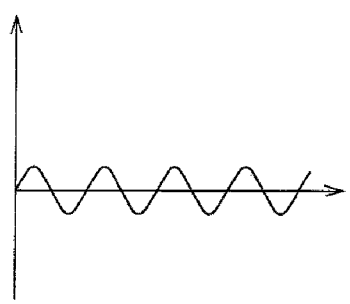
Fig. 9(B)
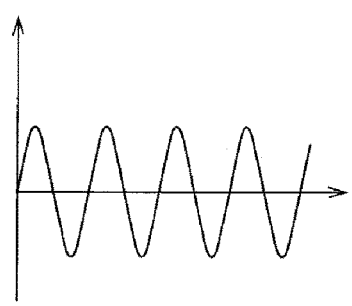

Fig. 10
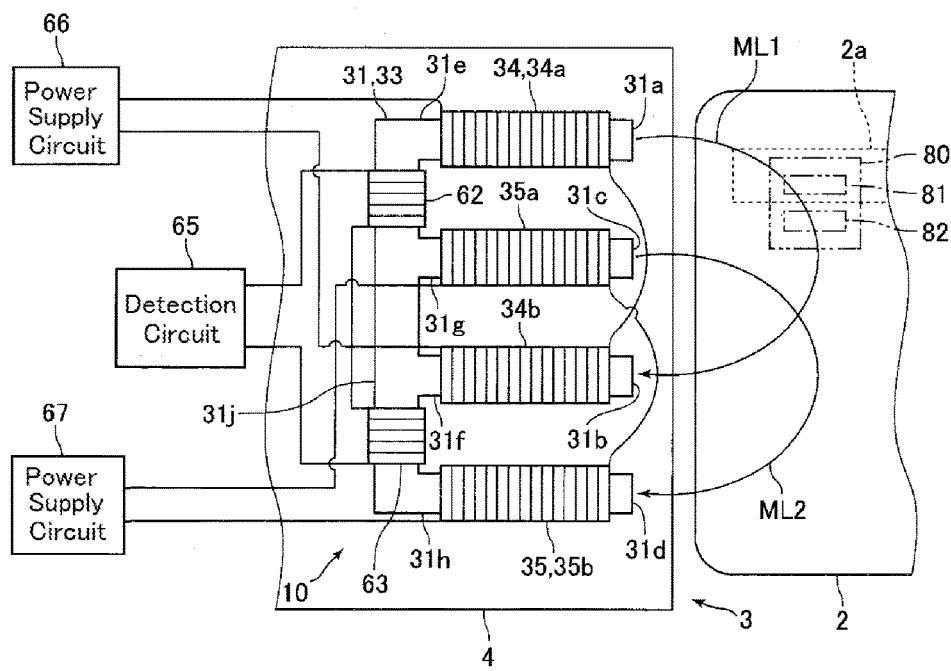
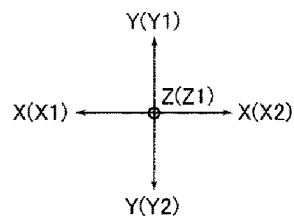
Fig. 11(A)
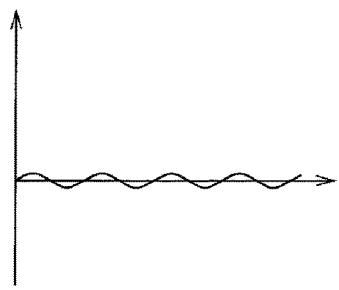
Fig. 11(B)
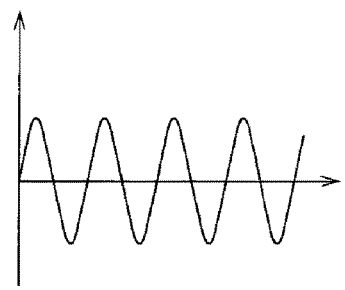

CARD READER

CROSS REFERENCE TO RELATED APPLICATIONS

This is the U.S. national stage of application No. PCT/JP2015/056482, filed on Mar. 5, 2015. Priority under 35 U.S.C. §119(a) and 35 U.S.C. §365(b) is claimed from Japanese Application No. 2014-044215, filed Mar. 6, 2014, the disclosure of which is incorporated herein by reference.

TECHNICAL FIELD

The present invention relates to a card reader structured to perform reading of magnetic data recorded on a card and/or recording magnetic data to a card.

BACKGROUND

Conventionally, a card reader has been widely utilized which is structured to read data recorded on a card and/or record data to a card. In an industry such as a financial institution where a card reader is utilized, illegal acquisition of magnetic data of a card by a criminal who attaches a magnetic head to a card insertion part of a card reader, in other words, so-called skimming has conventionally become a large issue. In order to cope with the issue, a card reader has been proposed in which a disturbing magnetic field is generated for preventing reading of magnetic data by a magnetic head for skimming (hereinafter, referred to as a "skimming magnetic head") (see, for example, Patent Literature 1).

Further, conventionally, a differential type skimming magnetic head in which a read head and a dummy head having substantially same electrical characteristics are accommodated in one case body has been known as a skimming magnetic head. The read head is a head configured to abut with a magnetic stripe of a card and to read magnetic data. The dummy head is adjacently disposed to the read head in a width direction of a card and is disposed at a position where the dummy head is not abutted with a magnetic stripe. When magnetic data of a card are read by the differential type skimming magnetic head, an output signal of the read head becomes a signal superposing a signal corresponding to magnetic data to a signal corresponding to an external magnetic field, and an output signal of the dummy head becomes a signal corresponding to the external magnetic field. Therefore, in a case that magnetic data are read by a differential type skimming magnetic head, even when a disturbing magnetic field is generated like the card reader described in Patent Literature 1, a read signal of magnetic data which is not affected by the disturbing magnetic field can be obtained by obtaining a difference between an output signal of the read head and an output signal of the dummy head. Accordingly, skimming is not prevented.

Therefore, a card reader for preventing skimming by a differential type skimming magnetic head has been proposed (see, for example, Patent Literature 2). The card reader described in Patent Literature 2 includes a disturbing magnetic field generation part having two radiation sources configured to radiate a disturbing magnetic field. The two radiation sources are disposed so as to interpose a conveying passage for a card in an upper and lower direction. A distance between one radiation source and the read head and a distance between the one radiation source and the dummy head are different from each other, and a distance between the other radiation source and the read head and a distance between the other radiation source and the dummy head are different from each other.

Therefore, in the card reader described in Patent Literature 2, a difference is generated between an amplitude (intensity) of an output signal of the read head and an amplitude of an output signal of the dummy head caused by the disturbing magnetic field from one radiation source, and a difference is generated between an amplitude of an output signal of the read head and an amplitude of the output signal of the dummy head caused by the disturbing magnetic field from the other radiation source. Therefore, according to this card reader, even when a difference between an output signal of the read head and an output signal of the dummy head is obtained, a read signal of magnetic data which is not affected by the disturbing magnetic field is unable to be obtained and, as a result, skimming by a differential type skimming magnetic head is prevented.

PATENT LITERATURE

[PTL 1] Japanese Patent Laid-Open No. 2001-67524
[PTL 2] Japanese Patent Laid-Open No. 2007-164533

In the card reader described in Patent Literature 2, in a case that a distance between the read head and the dummy head is wide, as described above, a difference is generated between an amplitude of an output signal of the read head and an amplitude of an output signal of the dummy head caused by a disturbing magnetic field from one radiation source, and a difference is generated between an amplitude of an output signal of the read head and an amplitude of an output signal of the dummy head caused by a disturbing magnetic field from the other radiation source. Therefore, skimming by a differential type skimming magnetic head can be prevented.

However, in the card reader described in Patent Literature 2, in a case that a distance between the read head and the dummy head becomes narrow, a difference between an amplitude of an output signal of the read head and an amplitude of an output signal of the dummy head caused by a disturbing magnetic field from one radiation source becomes extremely small and a difference between an amplitude of an output signal of the read head and an amplitude of an output signal of the dummy head caused by a disturbing magnetic field from the other radiation source becomes extremely small. Therefore, in this card reader, when a differential type skimming magnetic head whose distance between the read head and the dummy head is narrow is used, a read signal of magnetic data which is not affected by a disturbing magnetic field can be obtained by obtaining a difference between an output signal of the read head and an output signal of the dummy head. Accordingly, skimming cannot be prevented.

SUMMARY

Therefore, in view of the problem described above, at least an embodiment of the present invention provides a card reader which is capable of preventing skimming by a differential type skimming magnetic head even when the differential type skimming magnetic head in which a distance between a read head and a dummy head is narrow is used.

To achieve the above, at least an embodiment of the present invention provides a card reader including a card insertion port into which a card having a magnetic stripe is inserted, a card passage where the card inserted into the card insertion port is passed, and a disturbing magnetic field generation means structured to generate a magnetic field for disturbing fraudulent reading of magnetic data recorded in the magnetic stripe. The disturbing magnetic field generation means includes a core part having at least one core formed of magnetic material and a disturbing magnetic field generation coil wound around the core. When an inserting direction side of the card to the card insertion port which is one side of a passing direction of the card is referred to as a rear side and an ejecting direction of the card from the card insertion port which is the other side of the passing direction of the card is referred to as a front side, the core part includes a first end face and a second end face which are disposed so as to face substantially the front side. The disturbing magnetic field generation means generates a disturbing magnetic field in which a direction of a magnetic flux line is changed into a direction from the first end face toward the second end face and a direction from the second end face toward the first end face, and the direction of the magnetic flux line of the disturbing magnetic field going out from one of the first end face and the second end face and the direction entering into the other of the first end face and the second end face are substantially parallel to the passing direction of the card. In addition, in a width direction of the card perpendicular to the passing direction of the card and a thickness direction of the card, the magnetic flux line of the disturbing magnetic field crosses a position where the magnetic stripe is passed when the card is inserted.

In the card reader in accordance with at least an embodiment of the present invention, the disturbing magnetic field generation means includes a core part having a first end face and a second end face which are disposed so as to face substantially the front side, and generates a disturbing magnetic field in which a direction of a magnetic flux line is changed into a direction directing from the first end face toward the second end face and a direction directing from the second end face toward the first end face. Further, in at least an embodiment of the present invention, the magnetic flux line of the disturbing magnetic field crosses a position in a width direction of a card where a magnetic stripe is passed when the card is inserted. Therefore, according to at least an embodiment of the present invention, even when a distance is narrow between a read head and a dummy head of a differential type skimming magnetic head disposed at a position where a magnetic stripe is passed, a difference is capable of becoming large between intensity of the disturbing magnetic field at the portion where the read head is disposed and intensity of the disturbing magnetic field at the portion where the dummy head is disposed. Accordingly, a large difference is capable of being generated between an amplitude of an output signal of the read head caused by the disturbing magnetic field and an amplitude of an output signal of the dummy head caused by the disturbing magnetic field. As a result, in at least an embodiment of the present invention, even when a differential type skimming magnetic head is used in which a distance between the read head and the dummy head is narrow, it is difficult to acquire a read signal of magnetic data which is not affected by the disturbing magnetic field from a difference between an output signal of the read head and an output signal of the dummy head and thus skimming by the differential type skimming magnetic head is capable of being prevented.

Also in a case that each of the first end face and the second end face of the core part faces substantially an outer side in a width direction of a card, a disturbing magnetic field can be generated so that its magnetic flux line crosses a position in the width direction of the card where a magnetic stripe is passed. However, in this case, magnetic flux density of the disturbing magnetic field becomes lower at a position where a skimming magnetic head is disposed and it is difficult to effectively affect the skimming magnetic head by the disturbing magnetic field. On the other hand, according to at least an embodiment of the present invention, the first end face and the second end face are directed to substantially the front side and thus magnetic flux density of the disturbing magnetic field can be increased at a position where the skimming magnetic head is disposed. Therefore, influence of the disturbing magnetic field is capable of being effectively applied to the skimming magnetic head.

In at least an embodiment of the present invention, it is preferable that the first end face and the second end face are formed in one common core. According to this structure, leakage of the magnetic flux generated by the disturbing magnetic field generation coil can be restrained. Therefore, influence of the disturbing magnetic field is capable of being effectively applied to the skimming magnetic head.

In at least an embodiment of the present invention, it is preferable that the core part includes a third end face and a fourth end face which are disposed so as to face substantially the front side at positions displaced from the first end face and the second end face in the width direction of the card, the disturbing magnetic field generation means generates a second disturbing magnetic field in which a direction of a magnetic flux line is changed into a direction from the third end face toward the fourth end face and a direction from the fourth end face toward the third end face, a direction of the magnetic flux line of the second disturbing magnetic field going out from one of the third end face and the fourth end face and a direction entering into the other of the third end face and the fourth end face are substantially parallel to the passing direction of the card, and the first end face, the second end face, the third end face and the fourth end face are disposed so that the disturbing magnetic field and the second disturbing magnetic field are overlapped with each other on the front side with respect to the card insertion port.

According to this structure, a difference between intensity of the second disturbing magnetic field at the portion where the read head is disposed and intensity of the second disturbing magnetic field at the portion where the dummy head is disposed is capable of becoming large and thus, a relatively large difference is capable of being generated between an amplitude of an output signal of the read head caused by the second disturbing magnetic field and an amplitude of an output signal of the dummy head caused by the second disturbing magnetic field. Further, an output signal of the read head becomes a signal in which a signal depending on magnetic data, a signal depending on the disturbing magnetic field and a signal depending on the second disturbing magnetic field are superposed on each other, and an output signal of the dummy head becomes a signal in which a signal depending on the disturbing magnetic field and a signal depending on the second disturbing magnetic field are superposed on each other. Therefore, it is further difficult to acquire a read signal of magnetic data which is not affected by the disturbing magnetic field and the second disturbing magnetic field from a difference between the output signal of the read head and the output signal of the dummy head. Accordingly, skimming by a differential type skimming magnetic head is capable of being effectively prevented.

In at least an embodiment of the present invention, it is preferable that the core part includes, as the core, a first core formed with the first end face and the second end face and a second core formed with the third end face and the fourth end face, and the first core and the second core are disposed so as to interpose the card passage therebetween in a thickness direction of the card. According to this structure, in comparison with a case that the first core and the second core are disposed to one side of the card passage in a thickness direction of the card, a distance between the first core and a skimming magnetic head and a distance between the second core and the skimming magnetic head can be respectively set shorter. Therefore, influence of the disturbing magnetic field and the second disturbing magnetic field is capable of being effectively applied to the skimming magnetic head.

In at least an embodiment of the present invention, the first end face, the second end face, the third end face and the fourth end face may be formed in one common core. In this case, leakage of the magnetic flux generated by the disturbing magnetic field generation coil can be restrained. As a result, influence of the disturbing magnetic field and the second disturbing magnetic field is capable of being effectively applied to the skimming magnetic head. Further, in this case, structure of the disturbing magnetic field generation means can be simplified.

In at least an embodiment of the present invention, for example, the direction of the magnetic flux line of the disturbing magnetic field is periodically changed into the direction from the first end face toward the second end face and the direction from the second end face toward the first end face, and the direction of the magnetic flux line of the second disturbing magnetic field is periodically changed into the direction from the third end face toward the fourth end face and the direction from the fourth end face toward the third end face.

In at least an embodiment of the present invention, the card reader includes, for example, a card insertion part which is formed with the card insertion port and is formed in a hollow shape, and the core part and the disturbing magnetic field generation coil are disposed in an inside of the card insertion part.

In at least an embodiment of the present invention, it is preferable that the disturbing magnetic field generation means includes a detection coil which is wound around the core and is configured to detect a variation of the disturbing magnetic field. When a skimming magnetic head is attached to a front side of the card reader, the disturbing magnetic field is varied. Therefore, according to this structure, based on a detected result of the detection coil, it is capable of detecting whether a skimming magnetic head is attached or not. Further, according to this structure, the detection coil is wound around the core around which the disturbing magnetic field generation coil is wound and thus, in comparison with a case that a core around which a detection coil is wound is provided separately from the core around which the disturbing magnetic field generation coil is wound, the size of the card reader can be reduced. In addition, according to this structure, the disturbing magnetic field is not required to be stopped even while the detection coil detects whether a skimming magnetic head is attached or not and thus skimming can be prevented effectively.

In at least an embodiment of the present invention, it is preferable that the disturbing magnetic field generation means includes a detection coil, which is wound around the core and is configured to detect a variation of the disturbing magnetic field, and a second detection coil which is wound around the core and is configured to detect a variation of the second disturbing magnetic field. When a skimming magnetic head is attached to a front side of the card reader, the disturbing magnetic field and the second disturbing magnetic field are varied. Therefore, according to this structure, based on detected results of the detection coil and the second detection coil, it is capable of detecting whether a skimming magnetic head is attached or not. Further, according to this structure, the detection coil and the second detection coil are wound around the core around which the disturbing magnetic field generation coil is wound and thus, in comparison with a case that a core around which the detection coil is wound and a core around which the second detection coil is wound are provided separately from the core around which the disturbing magnetic field generation coil is wound, the size of the card reader can be reduced. In addition, according to this structure, the disturbing magnetic field is not required to be stopped even while the detection coil and the second detection coil detect whether a skimming magnetic head is attached or not and thus skimming can be prevented effectively.

In at least an embodiment of the present invention, it is preferable that the direction of the magnetic flux line of the disturbing magnetic field is periodically changed into the direction from the first end face toward the second end face and the direction from the second end face toward the first end face, the direction of the magnetic flux line of the second disturbing magnetic field is periodically changed into the direction from the third end face toward the fourth end face and the direction from the fourth end face toward the third end face, a changing period of the direction of the magnetic flux line of the disturbing magnetic field and a changing period of the direction of the magnetic flux line of the second disturbing magnetic field are set to be equal to each other, a phase of the disturbing magnetic field and a phase of the second disturbing magnetic field are set to be the same as each other or opposite to each other, and intensity of the disturbing magnetic field and intensity of the second disturbing magnetic field are set to be equal to each other. According to this structure, as a differential signal between an output signal of the detection coil and an output signal of the second detection coil, a differential signal in a sine wave shape which is varied with a constant period can be obtained. Further, even when ambient temperature of the disturbing magnetic field generation means is varied, an amplitude of the differential signal when a skimming magnetic head is not attached can be made constant and small. Accordingly, a threshold value for an amplitude of a differential signal can be set appropriately for determining whether a skimming magnetic head is attached or not. As a result, it is capable of detecting with a high degree of accuracy whether a skimming magnetic head is attached or not based on the amplitude of the differential signal.

Effects of the Invention

As described above, in the card reader in accordance with at least an embodiment of the present invention, even when a differential type skimming magnetic head in which a distance between a read head and a dummy head is narrow is used, skimming by the differential type skimming magnetic head is capable of being prevented.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 8 is an explanatory schematic plan view showing a structure of a disturbing magnetic field generation means in accordance with another embodiment of the present invention.

FIGS. 9(A) and 9(B) are explanatory views showing an output signal of a detection coil shown in FIG. 8. FIG. 9(A) is a view showing an output signal of a detection coil when no skimming magnetic head is attached to a front side of a card reader, and FIG. 9(B) is a view showing an output signal of a detection coil when a skimming magnetic head is attached to a front side of the card reader.

FIG. 10 is an explanatory schematic plan view showing a structure of a disturbing magnetic field generation means in accordance with another embodiment of the present invention.

FIGS. 11(A) and 11(B) are explanatory views showing a differential signal between an output signal of a detection coil and an output signal of a second detection coil shown in FIG. 10. FIG. 11(A) is a view showing a differential signal when no skimming magnetic head is attached on a front side of a card reader, and FIG. 11(B) is a view showing a differential signal when a skimming magnetic head is attached on a front side of a card reader.

DETAILED DESCRIPTION

At least an embodiment of the present invention will be described below with reference to the accompanying drawings.

(Structure of Card Reader)

Figure 1:
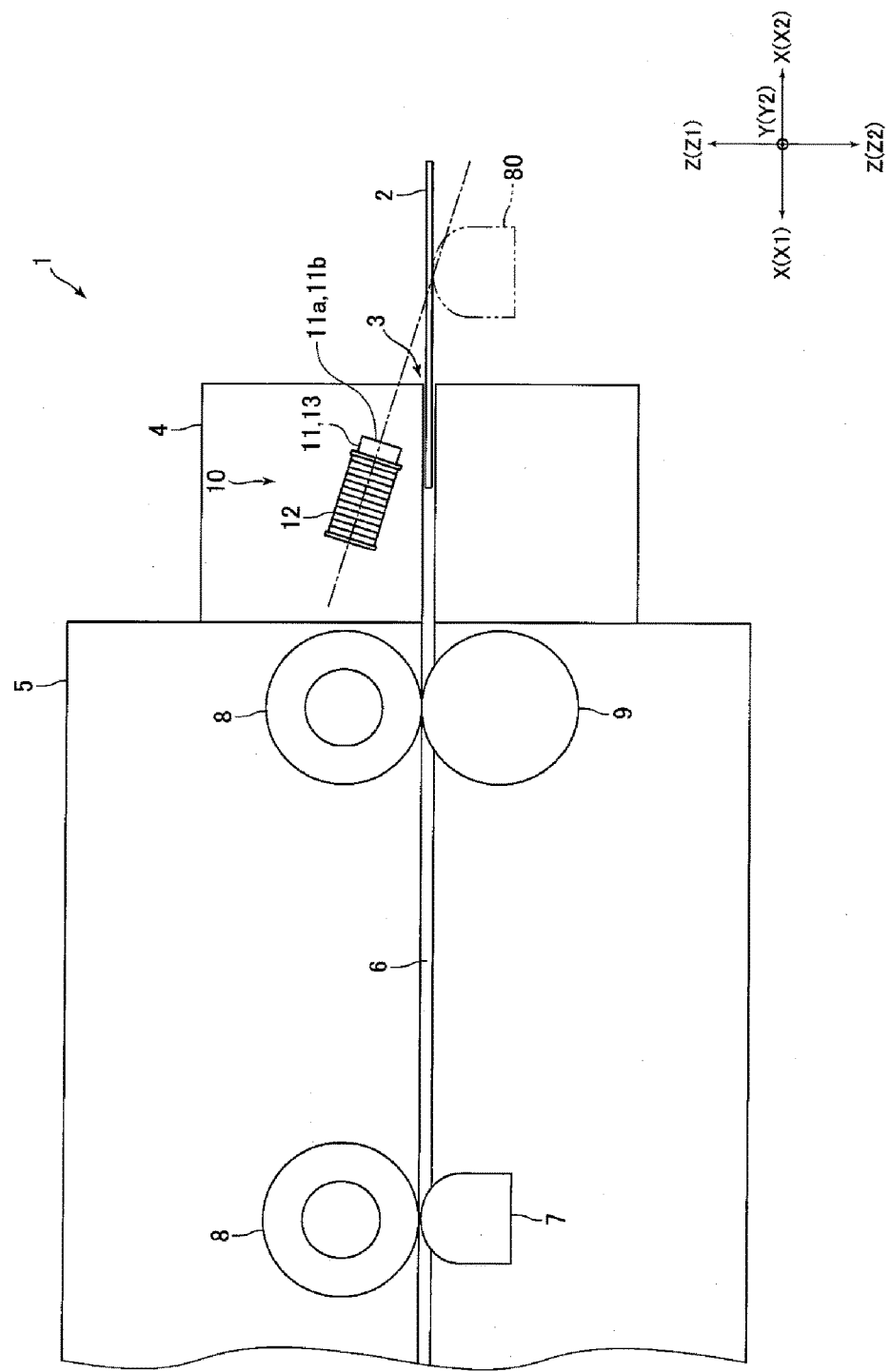
FIG. 1 is an explanatory schematic side view showing a structure of a front end side portion of a card reader in accordance with an embodiment of the present invention.
Figure 2:
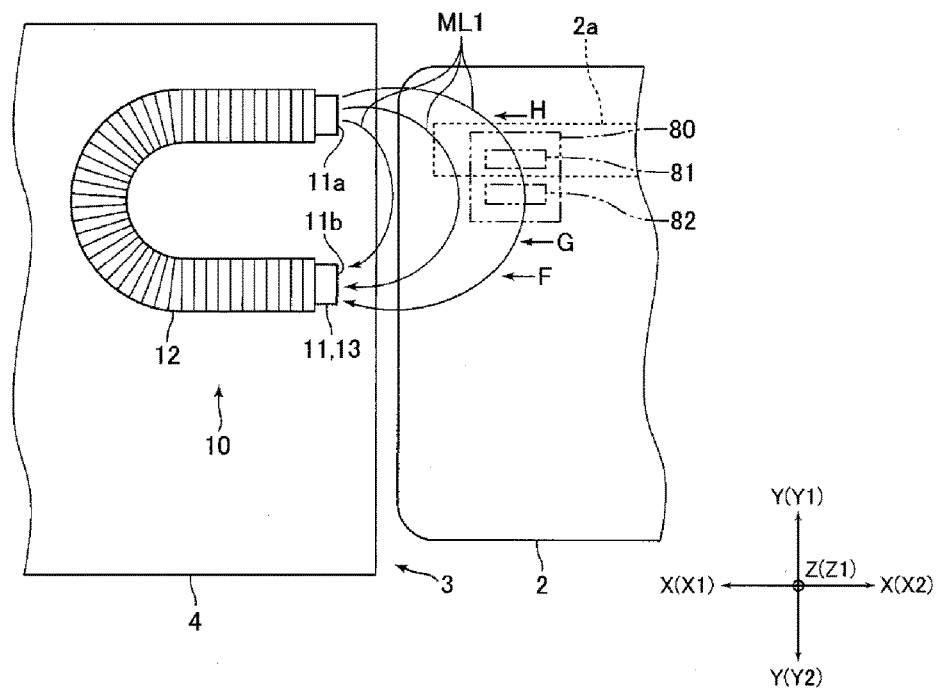
FIG. 2 is an explanatory schematic plan view showing a structure of a disturbing magnetic field generation means shown in FIG. 1.

FIG. 1 is an explanatory schematic side view showing a structure of a front end side portion of a card reader 1 in accordance with an embodiment of the present invention. FIG. 2 is an explanatory schematic plan view showing a structure of a disturbing magnetic field generation means 10 shown in FIG. 1. FIGS. 3(A) through 3(E) are explanatory views showing intensity and directionality of a disturbing magnetic field generated by the disturbing magnetic field generation means 10 shown in FIG. 2.

A card reader 1 in this embodiment is a device structured to perform reading of magnetic data recorded on a card 2 and/or recording of magnetic data to a card 2. For example, the card reader 1 is mounted and used in a predetermined host apparatus such as an ATM. The card reader 1 includes a card insertion part 4 formed with a card insertion port 3 into which a card 2 is inserted and a main body part 5. An inside of the card reader 1 is formed with a card passage 6 where a card 2 inserted from the card insertion port 3 is passed. Further, the card reader 1 includes a magnetic head 7 configured to perform at least one of reading of magnetic data recorded on a card 2 and recording of magnetic data to the card 2, a drive roller 8 and a pad roller 9 for conveying the card 2, and a disturbing magnetic field generation means 10 structured to generate a disturbing magnetic field for disturbing fraudulent reading of magnetic data recorded on the card 2.

In this embodiment, a card 2 is passed in the "X" direction shown in FIG. 1. Specifically, a card 2 is inserted to the "X1" direction and the card 2 is ejected to the "X2" direction. In other words, the "X" direction is a passing direction of a card 2, the "X1" direction is an inserting direction of a card 2 to the card insertion port 3, which is one side in the passing direction of a card 2, and the "X2" direction is an ejecting direction of the card 2 from the card insertion port 3 which is the other side in the passing direction of the card 2. Further, the "Z" direction in FIG. 1 perpendicular to the "X" direction is a thickness direction of a card 2 having been taken into the card reader 1, and the "Y" direction in FIG. 1 perpendicular to the "X" direction and the "Z" direction is a width direction of the card 2 having been taken into the card reader 1. In the following descriptions, the "X" direction is referred to as a "front and rear direction", the "Y" direction is referred to as a "right and left direction" and the "Z" direction is an "upper and lower direction". Further, the "X1" direction side is a "rear (back)" side, the "X2" direction side is a "front" side, the "Y1" direction side is a "right" side, the "Y2" direction side is a "left" side, the "Z1" direction side is an "upper" side, and the "Z2" direction side is a "lower" side.

A card 2 is, for example, a card made of vinyl chloride in a substantially rectangular shape whose thickness is about 0.7-0.8 mm. A magnetic stripe 2a in which magnetic data are recorded is formed on a rear face of the card 2. The magnetic stripe 2a is formed along a longitudinal direction of the card 2 which is formed in substantially a rectangular shape. A card 2 is inserted into the card reader 1 and is conveyed in an inside of the card reader 1 in a state that its rear face faces a lower side and that a longitudinal direction of the card 2 is substantially coincided with the front and rear direction. In accordance with an embodiment of the present invention, an IC chip may be incorporated into the card 2. Further, the card 2 may be a PET (polyethylene terephthalate) card whose thickness is about 0.18-0.36 mm or may be a paper card having a predetermined thickness.

The card insertion part 4 is attached to a front end face of the main body part 5. Further, the card insertion part 4 is formed in a hollow shape. The magnetic head 7, the drive roller 8 and the pad roller 9 are disposed in an inside of the main body part 5. The magnetic head 7 is disposed so as to face the card passage (card conveying passage) 6 from a lower side. Specifically, the magnetic head 7 is disposed so that its gap part faces the card passage 6 from a lower side. Further, the magnetic head 7 is disposed at a position in the right and left direction where a magnetic stripe 2a of a card 2 is passed. The drive roller 8 and the pad roller 9 are disposed so as to interpose the card passage 6 in the upper and lower direction. The drive roller 8 is connected with a motor through a power transmission mechanism such as a belt or a pulley. The pad roller 9 is urged toward the drive roller 8. A card 2 is conveyed in a state that the card 2 is sandwiched between the drive roller 8 and the pad roller 9.

A disturbing magnetic field generation means 10 includes a core 11 formed of magnetic material and an excitation coil 12 as a disturbing magnetic field generation coil which is wound around the core 11. In this embodiment, a core part 13 is structured of one core 11. The core 11 and the coil 12 are disposed in an inside of the card insertion part 4 formed in a hollow shape. Further, the core 11 and the coil 12 are disposed to an upper side of the card passage 6. In accordance with an embodiment of the present invention, the core 11 and the coil 12 may be disposed to a lower side of the card passage 6.

As shown in FIG. 2, the core 11 is formed in substantially a "U"-shape. One end face 11a and the other end face 11b of the core 11 are disposed so as to face substantially a front side. In this embodiment, one end face 11a and the other end face 11b are substantially parallel to the "Y-Z" plane structured of the right and left direction and the upper and lower direction. Further, one end face 11a and the other end face 11b are disposed on substantially the same plane. Further, one end face 11a and the other end face 11b are disposed so as to interpose a position in the right and left direction where a magnetic stripe 2a is passed. In other words, one end face 11a is disposed on a right side with respect to the position in the right and left direction where a magnetic stripe 2a is passed, and the other end face 11b is disposed on a left side with respect to the position in the right and left direction where the magnetic stripe 2a is passed. One end face 11a in this embodiment is a first end face and the other end face 11b is a second end face. Further, in this embodiment, one end face 11a which is the first end face and the other end face 11b which is the second end face are formed in one common core 11. In accordance with an embodiment of the present invention, it is preferable that the core 11 is disposed so that the position where a magnetic stripe 2a is passed is approached nearer to one of the one end face 11a and the other end face 11b than the other of the one end face 11a and the other end face 11b in the right and left direction. In this embodiment, the core 11 is disposed so that the position where a magnetic stripe 2a is passed is nearer to one end face 11a than the other end face 11b in the right and left direction.

The coil 12 is wound around the core 11 through a bobbin. The coil 12 is connected with an AC power supply circuit structured to supply an electric current to the coil 12. When an AC power source is supplied to the coil 12, a disturbing magnetic field is generated in which a direction of the magnetic flux line "ML1" is directed from one of one end face 11a and the other end face 11b toward the other of the one end face 11a and the other end face 11b. In other words, when the AC power source is supplied to the coil 12, the disturbing magnetic field generation means 10 generates a disturbing magnetic field whose direction of the magnetic flux line "ML1" is directed from one of the one end face 11a and the other end face 11b toward the other of the one end face 11a and the other end face 11b. Specifically, when the AC power source is supplied to the coil 12, a disturbing magnetic field (AC magnetic field) is generated in which the direction from the one end face 11a to the other end face 11b of the magnetic flux line "ML1" and the direction from the other end face 11b to the one end face 11a of the magnetic flux line "ML1" are periodically changed.

In accordance with an embodiment of the present invention, the coil 12 may be connected with a drive circuit which includes a DC power supply with which the coil 12 is connected and a capacitor connected with the DC power supply in parallel with the coil 12. In this case, a resonance circuit is structured of the capacitor and the coil 12 of the drive circuit. Further, the coil 12 may be connected with a DC power supply through a circuit such as an inverter by which a direct current is converted into an alternating current. In other words, it may be structured that the coil 12 is connected with a DC power supply through a predetermined circuit by which a direct current is converted to an alternating current and thereby the disturbing magnetic field generation means 10 periodically generates a disturbing magnetic field whose magnetic flux line "ML1" is directed from one of the one end face 11a and the other end face 11b to the other of the one end face 11a and the other end face 11b.

Further, in both of a case that an AC power supply is connected with the coil 12 and a case that a DC power supply is connected with the coil 12, when the direction of the magnetic flux line "ML1" is changed into the direction from the one end face 11a to the other end face 11b and the direction from the other end face 11b to the one end face 11a, the timing for changing the direction of the magnetic flux line "ML1" is not required to be periodic. In other words, when the direction of the magnetic flux line "ML1" is changed into a direction from the one end face 11a toward the other end face 11b and a direction from the other end face 11b toward the one end face 11a, the timing for changing the direction of the magnetic flux line "ML1" may be random.

As shown in FIG. 2, a direction of the magnetic flux line "ML1" of a disturbing magnetic field generated by the disturbing magnetic field generation means 10 which goes out from one of the one end face 11a and the other end face 11b and its direction entering into the other of the one end face 11a and the other end face 11b are substantially parallel to the front and rear direction. Further, the magnetic flux line "ML1" crosses a position in the right and left direction where a magnetic stripe 2a is passed when a card 2 is inserted.

Therefore, in a case that a differential type skimming magnetic head 80 having a read head 81 configured to abut with a magnetic stripe 2a for reading magnetic data recorded in a magnetic stripe 2a and a dummy head 82 which is adjacently disposed to a left side of the read head 81 at a position where it does not abut with the magnetic stripe 2a is arranged to a front side of the card reader 1 (for example, in a case that a skimming magnetic head 80 has been attached to a front end of the card insertion part 4 through a predetermined member or directly), even when a distance between the read head 81 and the dummy head 82 is narrow in the right and left direction, a difference becomes large between the intensity of the disturbing magnetic field at a position where the read head 81 is disposed and the intensity of the disturbing magnetic field at a position where the dummy head 82 is disposed. Therefore, for example, an output signal of the read head 81 caused by the disturbing magnetic field is varied as shown in FIG. 3(D), and an output signal of the dummy head 82 caused by the disturbing magnetic field is varied as shown in FIG. 3(C). In other words, a large difference is generated between an amplitude of an output signal of the read head 81 caused by the disturbing magnetic field and an amplitude of an output signal of the dummy head 82 caused by the disturbing magnetic field.

Figure 3A:
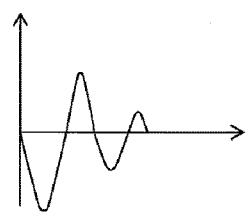
FIGS. 3(A) through 3(E) are explanatory views showing intensity of a disturbing magnetic field generated by a disturbing magnetic field generation means shown in FIG. 2.
Figure 3B:
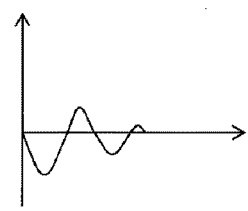
Figure 3C:
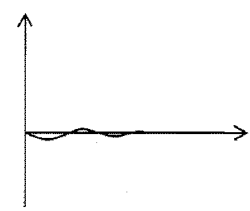
Figure 3D:
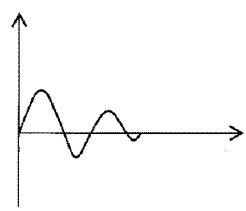
Figure 3E:
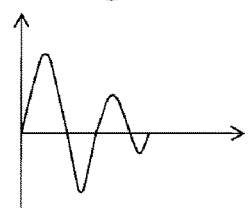

For example, in a case that the read head 81 or the dummy head 82 is disposed in the "F"-part in FIG. 2, an output signal of the read head 81 or the dummy head 82 caused by the disturbing magnetic field is varied as shown in FIG. 3(A). In a case that the read head 81 or the dummy head 82 is disposed in the "G"-part in FIG. 2, an output signal of the read head 81 or the dummy head 82 caused by the disturbing magnetic field is varied as shown in FIG. 3(B). In a case that the read head 81 or the dummy head 82 is disposed in the "H"-part in FIG. 2, an output signal of the read head 81 or the dummy head 82 caused by the disturbing magnetic field is varied as shown in FIG. 3(E). In other words, even when a disposing position in the right and left direction of the read head 81 or the dummy head 82 is slightly changed, the intensity of the disturbing magnetic field is varied largely and an amplitude of an output signal of the read head 81 or the dummy head 82 is varied largely.

In the card reader 1 structured as described above, when a card 2 is inserted into the card insertion port 3 and the card 2 is taken into an inside of the card reader 1 and, when the card 2 is ejected from the card insertion port 3, the disturbing magnetic field generation means 10 generates a disturbing magnetic field. In other words, the disturbing magnetic field generation means 10 does not generate a disturbing magnetic field at the time of reading and recording of magnetic data by the magnetic head 7. Further, when a card 2 is inserted into the card insertion port 3 and the card 2 is taken into the inside of the card reader 1, for example, the disturbing magnetic field generation means 10 generates a disturbing magnetic field until the entire card 2 inserted into the card insertion port 3 is taken into the inside of the card insertion part 4. Further, when the card 2 is to be ejected from the card insertion port 3, for example, the disturbing magnetic field generation means 10 generates a disturbing magnetic field until a card 2 having been conveyed to a position where the card 2 is capable of being taken out by a user is pulled out by the user.

In this embodiment, when a card is to be inserted, for example, the disturbing magnetic field generation means 10 intermittently generates a disturbing magnetic field until a card 2 is inserted into the card insertion port 3 and, when it is detected by an insertion detection sensor (not shown) that a card 2 has been inserted into the card insertion port 3, the disturbing magnetic field is generated continuously. Further, when the inserted card 2 is passed through the card insertion port 3 and is taken into the inside of the card reader 1, the disturbing magnetic field generation means 10 stops the disturbing magnetic field. In addition, in a case that the card is to be ejected, for example, when a card 2 is passed through the card insertion port 3 and is ejected toward the outside from the inside of the card reader 1, the disturbing magnetic field generation means 10 continuously generates a disturbing magnetic field and, when it is detected that the card 2 has been taken out from the card insertion port 3 by the insertion detection sensor, the disturbing magnetic field is generated intermittently.

(Principal Effects in this Embodiment)

As described above, in this embodiment, the one end face 11a and the other end face 11b of the core 11 are disposed so as to face substantially a front side and, when an AC power source is supplied to the coil 12, a disturbing magnetic field is generated in which the direction of the magnetic flux line "ML1" from the one end face 11a toward the other end face 11b and the direction of the magnetic flux line "ML1" from the other end face 11b toward the one end face 11a are periodically changed. Further, in this embodiment, the magnetic flux line "ML1" crosses a position in the right and left direction where a magnetic stripe 2a is passed when a card 2 is inserted. Therefore, according to this embodiment, as described above, even when a distance between the read head 81 and the dummy head 82 in the right and left direction is narrow, a difference between the intensity of a disturbing magnetic field at the portion where the read head 81 is disposed and the intensity of the disturbing magnetic field at the portion where the dummy head 82 is disposed becomes large and thus, a large difference is generated between an amplitude of an output signal of the read head 81 caused by the disturbing magnetic field and an amplitude of an output signal of the dummy head 82 caused by the disturbing magnetic field. Accordingly, in this embodiment, even when a differential type skimming magnetic head 80 is used in which a distance between the read head 81 and the dummy head 82 in the right and left direction is narrow, it is difficult to acquire a read signal of magnetic data which is not affected by the disturbing magnetic field from a difference between an output signal of the read head 81 and an output signal of the dummy head 82 and, as a result, skimming by a differential type skimming magnetic head 80 is capable of being prevented.

For example, even if the core 11 is formed in a bar shape and one end face of the core 11 faces the right side and the other end face of the core 11 faces the left side, a disturbing magnetic field can be generated so that its magnetic flux line crosses a position in the right and left direction where a magnetic stripe 2a is passed. However, in this case, magnetic flux density of a disturbing magnetic field is reduced at a position where a skimming magnetic head 80 is disposed and it is difficult to effectively affect the skimming magnetic head 80 by the disturbing magnetic field. On the other hand, according to this embodiment, the one end face 11a and the other end face 11b face the front side and thus magnetic flux density of a disturbing magnetic field can be increased at a position where the skimming magnetic head 80 is disposed. Therefore, influence of the disturbing magnetic field is capable of being effectively applied to the skimming magnetic head 80.

In this embodiment, the one end face 11a and the other end face 11b are formed in one common core 11. Therefore, according to this embodiment, leakage of magnetic flux generated by the coil 12 can be restrained. Accordingly, in this embodiment, influence of the disturbing magnetic field is capable of being effectively applied to the skimming magnetic head 80.

First Modified Embodiment of Disturbing Magnetic Field Generation Device

Figure 4:
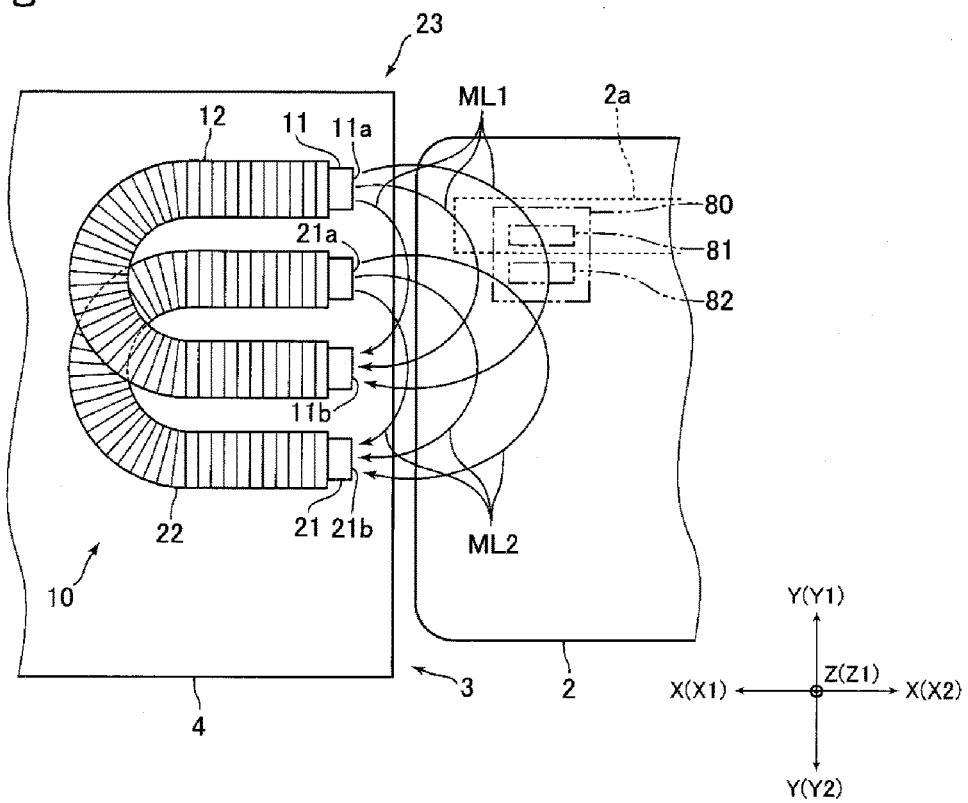
FIG. 4 is an explanatory schematic plan view showing a structure of a disturbing magnetic field generation means in accordance with another embodiment of the present invention.
Figure 5:
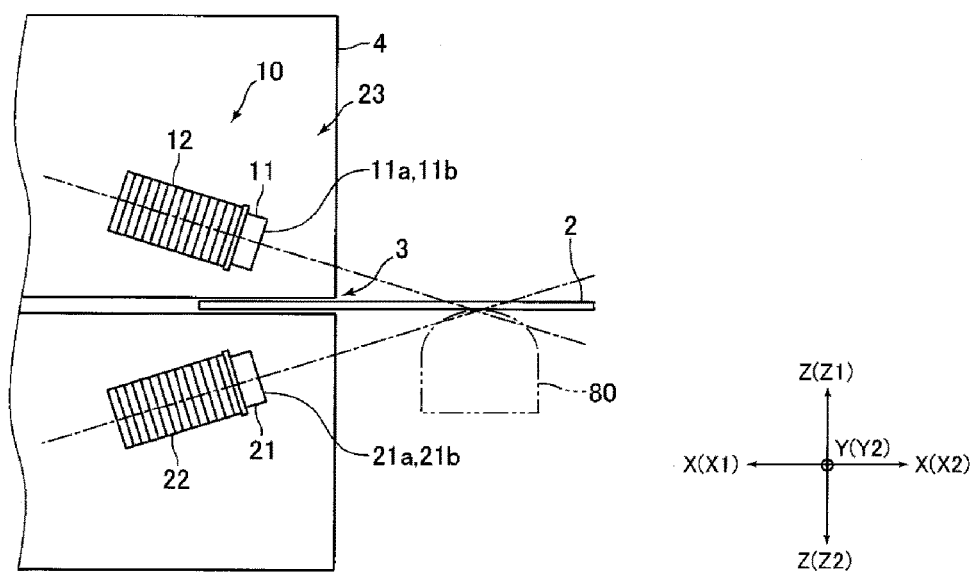
FIG. 5 is an explanatory schematic side view showing a structure of a disturbing magnetic field generation means shown in FIG. 4.

FIG. 4 is an explanatory schematic plan view showing a structure of a disturbing magnetic field generation means 10 in accordance with another embodiment of the present invention. FIG. 5 is an explanatory schematic side view showing a structure of the disturbing magnetic field generation means 10 shown in FIG. 4.

In the embodiment described above, the disturbing magnetic field generation means 10 includes one core 11. However, the disturbing magnetic field generation means 10 may include, as shown in FIGS. 4 and 5, a core 21 formed of magnetic material in addition to the core 11. In this case, a core part 23 is structured of two cores 11 and 21. Further, a coil 22 is wound around the core 21 as a disturbing magnetic field generation coil through a bobbin. The core 21 and the coil 22 are disposed in an inside of the card insertion part 4 formed in a hollow shape. Further, the core 21 and the coil 22 are disposed to a lower side of the card passage 6. In other words, the core 11 and the core 21 are disposed so as to interpose the card passage 6 therebetween in the upper and lower direction.

The core 21 is formed in the same shape as the core 11. In other words, the core 21 is formed in substantially a "U"-shape. One end face 21*a* and the other end face 21*b* of the core 21 are disposed so as to face substantially a front side. The one end face 21*a* and the other end face 21*b* are substantially parallel to the "Y-Z" plane and are disposed on substantially the same plane. Further, the one end face 21*a* and the other end face 21*b* are disposed on substantially the same plane as the one end face 11*a* and the other end face 11*b*. Further, as shown in FIG. 4, in the right and left direction, the one end face 21*a* is disposed between the one end face 11*a* and the other end face 11*b*, and the other end face 21*b* is disposed on a left side with respect to the other end face 11*b*. In other words, the one end face 21*a* and the other end face 21*b* are disposed at positions in the right and left direction displaced from the one end face 11*a* and the other end face 11*b*. In this modified embodiment, the one end face 21*a* is a third end face and the other end face 21*b* is a fourth end face. Further, the core 11 is a first core and the core 21 is a second core.

The coil 22 is connected with an AC power supply circuit structured to supply an electric current to the coil 22. When an AC power source is supplied to the coil 22, a disturbing magnetic field (hereinafter, the disturbing magnetic field is referred to as a "second disturbing magnetic field") is generated in which a direction of a magnetic flux line "ML2" is directed from one of the one end face 21*a* and the other end face 21*b* toward the other of the one end face 21*a* and the other end face 21*b*. In other words, when the AC power source is supplied to the coil 22, the disturbing magnetic field generation means 10 generates a second disturbing magnetic field whose direction of the magnetic flux line "ML2" is directed from one of the one end face 21*a* and the other end face 21*b* toward the other of the one end face 21*a* and the other end face 21*b*. Specifically, when the AC power source is supplied to the coil 22, a second disturbing magnetic field (AC magnetic field) is generated in which the direction of the magnetic flux line "ML2" from the one end face 21*a* to the other end face 21*b* and the direction of the magnetic flux line "ML2" from the other end face 21*b* to the one end face 21*a* are periodically changed.

A direction of the magnetic flux line "ML2" of the second disturbing magnetic field which goes out from one of the one end face 21*a* and the other end face 21*b* and its direction entering into the other of the one end face 21*a* and the other end face 21*b* are substantially parallel to the front and rear direction. Further, in the modified embodiment, as shown in FIG. 4, the disturbing magnetic field generated when the AC power source is supplied to the coil 12 and the second disturbing magnetic field generated when the AC power source is supplied to the coil 22 are overlapped with each other on a front side with respect to the card insertion port 3. In other words, in the modified embodiment, the one end faces 11*a* and 21*a* and the other end faces 11*b* and 21*b* are disposed so that the disturbing magnetic field generated by supplying an AC power source to the coil 12 and the second disturbing magnetic field are overlapped with each other on a front side with respect to the card insertion port 3. Further, in the modified embodiment, a frequency of the disturbing magnetic field generated by supplying an AC power to the coil 12 and a frequency of the second disturbing magnetic field are different from each other. Alternatively, in the modified embodiment, a frequency of the disturbing magnetic field generated by supplying an AC power source to the coil 12 and a frequency of the second disturbing magnetic field are set to be the same as each other but a phase of the disturbing magnetic field generated by supplying the AC power source to the coil 12 and a phase of the second disturbing magnetic field are shifted from each other.

In the modified embodiment, a difference between the intensity of the second disturbing magnetic field at the portion where the read head 81 is disposed and the intensity of the second disturbing magnetic field at the portion where the dummy head 82 is disposed is capable of becoming relatively large and thus, a relatively large difference is capable of being generated between an amplitude of an output signal of the read head 81 caused by the second disturbing magnetic field and an amplitude of an output signal of the dummy head 82 caused by the second disturbing magnetic field. Further, in the modified embodiment, an output signal of the read head 81 becomes a signal in which a signal depending on magnetic data recorded in a card 2, a signal depending on the disturbing magnetic field generated by supplying an AC power source to the coil 12, and a signal depending on the second disturbing magnetic field are superposed on each other. Further, an output signal of the dummy head 82 becomes a signal in which a signal depending on the disturbing magnetic field generated by supplying the AC power source to the coil 12 and a signal depending on the second disturbing magnetic field are superposed on each other. Therefore, it is further difficult to acquire a read signal of magnetic data which is not affected by the disturbing magnetic field and the second disturbing magnetic field from a difference between the output signal of the read head 81 and the output signal of the dummy head 82. Accordingly, in the modified embodiment, skimming by a differential type skimming magnetic head 80 is capable of being prevented.

Especially, in the modified embodiment, a frequency of the disturbing magnetic field generated by supplying an AC power to the coil 12 and a frequency of the second disturbing magnetic field are different from each other. Alternatively, a frequency of the disturbing magnetic field generated by supplying an AC power source to the coil 12 and a frequency of the second disturbing magnetic field are the same as each other but a phase of the disturbing magnetic field generated by supplying the AC power source to the coil 12 and a phase of the second disturbing magnetic field are shifted from each other. Therefore, it is further difficult to acquire a read signal of magnetic data which is not affected by the disturbing magnetic field and the second disturbing magnetic field from a difference between the output signal of the read head 81 and the output signal of the dummy head 82. Accordingly, in the modified embodiment, skimming by a differential type skimming magnetic head 80 is capable of being further effectively prevented.

Further, in the modified embodiment, the core 11 and the core 21 are disposed so as to interpose the card passage 6 therebetween in the upper and lower direction. Therefore, for example, in comparison with a case that both of the core 11 and the core 21 are disposed to an upper side or a lower side of the card passage 6, a distance between the core 11 and the skimming magnetic head 80 and a distance between the core 21 and the skimming magnetic head 80 can be respectively set shorter. Accordingly, in the modified embodiment, influence of the disturbing magnetic field and the second disturbing magnetic field is capable of being effectively applied to the skimming magnetic head 80.

In accordance with an embodiment of the present invention, in the modified embodiment, it may be structured that a frequency of the disturbing magnetic field generated by supplying an AC power source to the coil 12 and a frequency of the second disturbing magnetic field are the same as each other and, in addition, a phase of the disturbing magnetic field generated by supplying the AC power source to the coil 12 and a phase of the second disturbing magnetic field are coincided with each other. Further, in the modified embodiment, the core 11 and the core 21 are disposed so as to interpose the card passage 6 therebetween in the upper and lower direction. However, the core 11 and the core 21 may be disposed to an upper side or a lower side of the card passage 6. In addition, in the modified embodiment, as shown in FIG. 4, the one end face 21a and the other end face 21b are not disposed in the right and left direction so as to interpose a position where a magnetic stripe 2a is passed. However, the one end face 21a and the other end face 21b may be disposed in the right and left direction so as to interpose a position where a magnetic stripe 2a is passed. In this case, for example, the other end face 21b is disposed in the right and left direction between the one end face 11a and the other end face 11b, and the one end face 21a is disposed on a right side with respect to the one end face 11a.

Second Modified Embodiment of Disturbing Magnetic Field Generation Device

Figure 6:
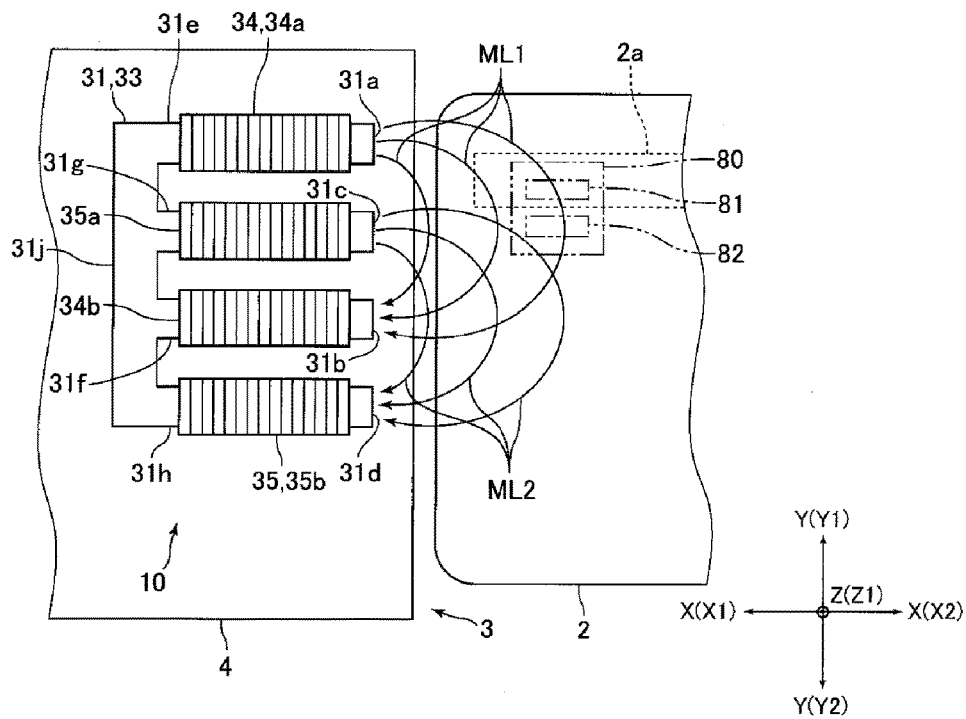
FIG. 6 is an explanatory schematic plan view showing a structure of a disturbing magnetic field generation means in accordance with another embodiment of the present invention.

FIG. 6 is an explanatory schematic plan view showing a structure of a disturbing magnetic field generation means 10 in accordance with another embodiment of the present invention.

In the modified embodiment shown in FIGS. 4 and 5, the core 11 formed with the one end face 11a and the other end face 11b and the core 21 formed with the one end face 21a and the other end face 21b are separately formed from each other. However, the present invention is not limited to this embodiment. For example, as shown in FIG. 6, a first end face 31a corresponding to the one end face 11a, a second end face 31b corresponding to the other end face 11b, a third end face 31c corresponding to the one end face 21a, and a fourth end face 31d corresponding to the other end face 21b may be formed in one common core 31. In this case, the core 31 is structured of a first core portion 31e, a second core portion 31f, a third core portion 31g and a fourth core portion 31h each of which is formed in a bar shape and is, when viewed in the upper and lower direction, disposed with the front and rear direction as its longitudinal direction, and a connecting core portion 31j in a bar shape which connects rear ends of the first through the fourth core portions 31e through 31h and is, when viewed in the upper and lower direction, disposed with the right and left direction as its longitudinal direction. Further, in this case, a core part 33 is structured of one core 31.

A front end face of the first core portion 31e is a first end face 31a, a front end face of the second core portion 31f is a second end face 31b, a front end face of the third core portion 31g is a third end face 31c, and a front end face of the fourth core portion 31h is a fourth end face 31d. A coil 34 as a disturbing magnetic field generation coil is wound around the first core portion 31e and the second core portion 31f, and a coil 35 as a disturbing magnetic field generation coil is wound around the third core portion 31g and the fourth core portion 31h. A winding direction of the coil 34 in the coil part 34a which is a portion where the coil 34 is wound around the first core portion 31e and a winding direction of the coil 34 in the coil part 34b which is a portion where the coil 34 is wound around the second core portion 31f are reversed. Further, a winding direction of the coil 35 in the coil part 35a which is a portion where the coil 35 is wound around the third core portion 31g and a winding direction of the coil 35 in the coil part 35b which is a portion where the coil 35 is wound around the fourth core portion 31h are reversed. The core 31 and the coils 34 and 35 are disposed to an upper side or a lower side of the card passage 6.

The coil 34 is connected with an AC power supply circuit structured to supply an electric current to the coil 34, and the coil 35 is connected with an AC power supply circuit structured to supply an electric current to the coil 35. When an AC power source is supplied to the coil 34, similarly to the embodiments described above, a disturbing magnetic field (AC magnetic field) is generated in which the direction of the magnetic flux line "ML1" from the first end face 31a to the second end face 31b and the direction of the magnetic flux line "ML1" from the second end face 31b to the first end face 31a are periodically changed. The magnetic flux line "ML1" crosses a position in the right and left direction where a magnetic stripe 2a is passed when a card 2 is inserted. Further, When an AC power source is supplied to the coil 35, similarly to the embodiment shown in FIGS. 4 and 5, a second disturbing magnetic field (AC magnetic field) is generated in which the direction of the magnetic flux line "ML2" from the third end face 31c to the fourth end face 31d and the direction of the magnetic flux line "ML2" from the fourth end face 31d to the third end face 31c are periodically changed. Further, the disturbing magnetic field generated by supplying an AC power source to the coil 34 and the second disturbing magnetic field generated by supplying an AC power source to the coil 35 are overlapped with each other on a front side with respect to the card insertion port 3.

Therefore, also in this modified embodiment, similarly to the modified embodiment shown in FIGS. 4 and 5, skimming by a differential type skimming magnetic head 80 is capable of being effectively prevented. Further, in this modified embodiment, the coils 34 and 35 are wound around one core 31 and thus leakage of the magnetic flux generated by the coils 34 and 35 can be restrained. As a result, influence of the disturbing magnetic field and influence of the second disturbing magnetic field are capable of being effectively applied to the skimming magnetic head 80. Further, in this modified embodiment, the coils 34 and 35 are wound around one core 31 and thus a structure of the disturbing magnetic field generation means 10 can be simplified.

In accordance with an embodiment of the present invention, in a case that a disturbing magnetic field is generated in which the direction of the magnetic flux line "ML1" from the first end face 31a to the second end face 31b and the direction of the magnetic flux line "ML1" from the second end face 31b to the first end face 31a are periodically changed, it may be structured that two coils are separately wound around the first core portion 31e and the second core portion 31f and that an AC power source is separately connected with the two coils. Further, in a case that a second disturbing magnetic field is generated in which the direction of the magnetic flux line "ML2" from the third end face 31c to the fourth end face 31d and the direction of the magnetic flux line "ML2" from the fourth end face 31d to the third end face 31c are periodically changed, it may be structured that two coils are separately wound around the third core portion 31g and the fourth core portion 31h and that an AC power source is separately connected with the two coils.

Third Modified Embodiment of Disturbing Magnetic Field Generation Device

Figure 7:
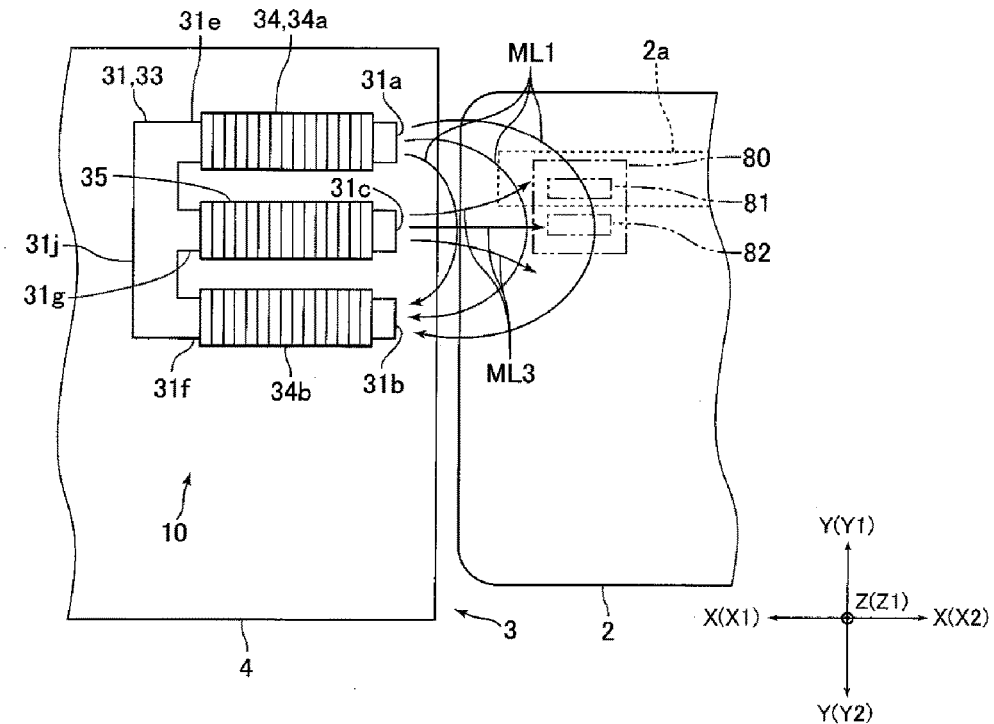
FIG. 7 is an explanatory schematic plan view showing a structure of a disturbing magnetic field generation means in accordance with another embodiment of the present invention.

FIG. 7 is an explanatory schematic plan view showing a structure of a disturbing magnetic field generation means 10 in accordance with another embodiment of the present invention.

The core 31 shown in FIG. 6 may be formed in a shape having no fourth core portion 31h as shown in FIG. 7. In this case, a coil 35 is wound around the third core portion 31g and, when an AC power source is supplied to the coil 35, a disturbing magnetic field (AC magnetic field) is generated in which a direction of a magnetic flux line "ML3" is periodically changed into a direction entering to the third end face 31c and a direction going out from the third end face 31c. The disturbing magnetic field generated by supplying an AC power source to the coil 34 and the disturbing magnetic field generated by supplying an AC power source to the coil 35 are overlapped with each other to a front side of the card insertion port 3. Therefore, also in this modified embodiment, skimming by a differential type skimming magnetic head 80 is capable of being further effectively prevented.

Fourth Modified Embodiment of Disturbing Magnetic Field Generation Device

FIG. 8 is an explanatory schematic plan view showing a structure of a disturbing magnetic field generation means 10 in accordance with another embodiment of the present invention. FIGS. 9(A) and 9(B) are explanatory views showing an output signal of a detection coil 52 shown in FIG. 8. FIG. 9(A) is a view showing an output signal of a detection coil 52 when no skimming magnetic head 80 is attached to a front side of the card reader 1, and FIG. 9(B) is a view showing an output signal of a detection coil 52 when a skimming magnetic head 80 is attached to a front side of the card reader 1.

In the embodiments described above, the disturbing magnetic field generation device 10 may be provided with a detection coil 52 configured to detect a variation of a disturbing magnetic field generated by supplying an AC power source to the coil 12. In this case, as shown in FIG. 8, the core 11 is structured of a first core portion 11d and a second core portion 11e in a bar shape which are disposed with the front and rear direction as a longitudinal direction when viewed in the upper and lower direction, and a connecting core portion 11f in a bar shape which is disposed with the right and left direction as a longitudinal direction when viewed in the upper and lower direction and connects rear ends of the first core portion 11d and the second core portion 11e. A front end face of the first core portion 11d is one end face 11a and a front end face of the second core portion 11e is the other end face 11b.

The coil 12 is divided into a coil part 12a wound around the first core portion 11d and a coil part 12b wound around the second core portion 11e. Further, the coil 12 is connected with an AC power supply circuit 54 structured to supply an electric current to the coil 12. The detection coil 52 is wound around the connecting core portion 11f. In other words, the detection coil 52 is wound around the core 11. The detection coil 52 detects a variation of magnetic flux passing through the connecting core portion 11f. Further, the detection coil 52 is connected with a detection circuit 55 and an output signal of the detection coil 52 is inputted into the detection circuit 55. In FIG. 8, the same reference signs are used in structures similar to the embodiments described above.

An output signal of the detection coil 52 is, for example, as shown in FIGS. 9(A) and 9(B), varied in a sine wave shape with an amplitude corresponding to intensity of the disturbing magnetic field and with the same period as a period of the disturbing magnetic field. Further, when a skimming magnetic head 80 is attached to a front side of the card reader 1, the disturbing magnetic field is varied and thus the amplitude of an output signal of the detection coil 52 is changed. For example, when no skimming magnetic head 80 is attached to a front side of the card reader 1, an amplitude of an output signal of the detection coil 52 is small as shown in FIG. 9(A). However, when a skimming magnetic head 80 is attached to a front side of the card reader 1, the amplitude is changed to be large as shown in FIG. 9(B).

In other words, an amplitude of an output signal of the detection coil 52 (output signal shown in FIG. 9(B)) when a skimming magnetic head 80 is attached to a front side of the card reader 1 becomes larger than an amplitude of an output signal of the detection coil 52 (output signal shown in FIG. 9(A)) when a skimming magnetic head 80 is not attached to a front side of the card reader 1. Therefore, the detection circuit 55 detects whether a skimming magnetic head 80 is attached to a front side of the card reader 1 or not based on an amplitude of an output signal of the detection coil 52. Further, in the card reader 1, when a skimming magnetic head 80 attached to a front side is detected, a predetermined abnormality processing is executed, for example, an alarm is transmitted to a host apparatus.

In this modified embodiment, it is detected whether a skimming magnetic head 80 is attached to a front side of the card reader 1 or not and, when a skimming magnetic head 80 attached to a front side of the card reader 1 is detected, a predetermined abnormality processing is executed. Therefore, skimming by a skimming magnetic head 80 is capable of being effectively prevented. Especially, in this modified embodiment, even while it is detected whether a skimming magnetic head 80 is attached or not, a disturbing magnetic field is not required to be stopped and thus skimming by a skimming magnetic head 80 is capable of being further effectively prevented. Further, in this modified embodiment, the detection coil 52 is wound around the core 11 around which the coil 12 is wound and thus, in comparison with a case that, in addition to the core 11, another core around which the detection coil 52 is wound is provided separately, the size of the card reader 1 can be reduced.

Fifth Modified Embodiment of Disturbing Magnetic Field Generation Device

FIG. 10 is an explanatory schematic plan view showing a structure of a disturbing magnetic field generation means 10 in accordance with another embodiment of the present invention. FIGS. 11(A) and 11(B) are explanatory views showing a differential signal between an output signal of a detection coil 62 and an output signal of a detection coil 63 shown in FIG. 10. FIG. 11(A) is a view showing a differential signal when no skimming magnetic head 80 is attached on a front side of a card reader 1, and FIG. 11(B) is a view showing a differential signal when a skimming magnetic head 80 is attached on a front side of a card reader 1.

In the modified embodiment shown in FIG. 6, the disturbing magnetic field generation device 10 may include a detection coil 62 configured to detect a variation of the disturbing magnetic field generated by supplying an AC power source to the coil 34 and a detection coil 63 as a second detection coil configured to detect a variation of the second disturbing magnetic field generated by supplying an AC power source to the coil 35. As shown in FIG. 10, the detection coil 62 is wound around a portion of the connecting core portion 31j between the first core portion 31e and the third core portion 31g, and the detection coil 63 is wound around a portion of the connecting core portion 31j between the second core portion 31f and the fourth core portion 31h. In other words, the detection coils 62 and 63 are wound around the core 31. The detection coil 62 detects a variation of magnetic flux passing through the portion of the connecting core portion 31*j* between the first core portion 31*e* and the third core portion 31*g*, and the detection coil 63 detects a variation of magnetic flux passing through the portion of the connecting core portion 31*j* between the second core portion 31*f* and the fourth core portion 31*h*.

The detection coil 62 and the detection coil 63 are serially-connected with each other. In other words, one end of the detection coil 62 is connected with one end of the detection coil 63. A winding direction of the detection coil 62 and a winding direction of the detection coil 63 are opposite to each other. Further, a winding number of the detection coil 62 and a winding number of detection coil 63 are equal to each other. The other ends of the detection coils 62 and 63 are connected with a detection circuit 65, and a differential signal which is a difference between an output signal of the detection coil 62 and an output signal of the detection coil 63 is inputted to the detection circuit 65. In FIG. 10, the same reference signs are used in the structures similar to those in the modified embodiment shown in FIG. 6.

The coil 34 is connected with an AC power supply circuit 66 structured to supply an electric current to the coil 34 and the coil 35 is connected with an AC power supply circuit 67 structured to supply an electric current to the coil 35. When an AC power source is supplied to the coil 34, a disturbing magnetic field is generated in which the direction of the magnetic flux line "ML1" from the first end face 31*a* to the second end face 31*b* and the direction of the magnetic flux line "ML1" from the second end face 31*b* to the first end face 31*a* are periodically changed. Further, when an AC power source is supplied to the coil 35, a second disturbing magnetic field is generated in which the direction of the magnetic flux line "ML2" from the third end face 31*c* to the fourth end face 31*d* and the direction of the magnetic flux line "ML2" from the fourth end face 31*d* to the third end face 31*c* are periodically changed.

In this modified embodiment, a frequency of the disturbing magnetic field and a frequency of the second disturbing magnetic field are set to be equal to each other. In other words, a changing period of the direction of magnetic flux line of the disturbing magnetic field and a changing period of the direction of magnetic flux line of the second disturbing magnetic field are equal to each other. Further, a phase of the disturbing magnetic field and a phase of the second disturbing magnetic field are set to be the same as each other. Specifically, when the disturbing magnetic field begins to be generated so that the magnetic flux line "ML1" is directed from the first end face 31*a* toward the second end face 31*b*, the second disturbing magnetic field begins to be generated so that the magnetic flux line "ML2" is directed from the third end face 31*c* toward the fourth end face 31*d*. Further, when the disturbing magnetic field begins to be generated in the direction from the second end face 31*b* toward the first end face 31*a*, the second disturbing magnetic field begins to be generated in the direction from the fourth end face 31*d* toward the third end face 31*c*. In addition, the intensity (amplitude) of the disturbing magnetic field and the intensity (amplitude) of the second disturbing magnetic field are set to be equal to each other.

In this modified embodiment, the core 31 is disposed so that the magnetic flux line "ML1" crosses a position where a magnetic stripe 2*a* is passed when a card 2 is inserted, but that the magnetic flux line "ML2" does not cross the position where a magnetic stripe 2*a* is passed when a card 2 is inserted (in other words, the magnetic flux line "ML2" passes so as to avoid the position where a magnetic stripe 2*a* is passed when a card 2 is inserted). In this modified embodiment, the coil 34 is connected with the AC power supply circuit 66 and the coil 35 is connected with the AC power supply circuit 67. However, the coil 34 and the coil 35 may be connected with a common AC power supply circuit.

In this modified embodiment, a winding direction of the detection coil 62 and a winding direction of the detection coil 63 are opposite to each other. Further, in this modified embodiment, a frequency of the disturbing magnetic field and a frequency of the second disturbing magnetic field are equal to each other, a phase of the disturbing magnetic field and a phase of the second disturbing magnetic field are the same as each other and, in addition, intensity of the disturbing magnetic field and intensity of the second disturbing magnetic field are equal to each other and thus the disturbing magnetic field and the second disturbing magnetic field are balanced with each other. Therefore, when a skimming magnetic head 80 is not attached to a front side of the card reader 1, a differential signal between an output signal of the detection coil 62 and an output signal of the detection coil 63 becomes, for example, as shown in FIG. 11(A), a signal in a sine wave shape whose amplitude is extremely small and whose period is the same as the periods of the disturbing magnetic field and the second disturbing magnetic field. Alternatively, when a skimming magnetic head 80 is not attached to a front side of the card reader 1, a differential signal between an output signal of the detection coil 62 and an output signal of the detection coil 63 is not outputted.

When a skimming magnetic head 80 is attached to a front side of the card reader 1, the disturbing magnetic field is varied and the balance between the disturbing magnetic field and the second disturbing magnetic field is changed and thus the amplitude of the differential signal is changed. For example, when a skimming magnetic head 80 is attached to a front side of the card reader 1, an amplitude of the differential signal becomes large as shown in FIG. 11(B). Therefore, the detection circuit 65 detects whether a skimming magnetic head 80 is attached to a front side of the card reader 1 or not based on an amplitude of the differential signal. Further, in the card reader 1, when a skimming magnetic head 80 attached to a front side is detected, a predetermined abnormality processing is executed, for example, an alarm is transmitted to a host apparatus.

Also in this modified embodiment, similar effects to the modified embodiment shown in FIG. 8 can be obtained. Further, in this modified embodiment, a winding direction of the detection coil 62 and a winding direction of the detection coil 63 are opposite to each other, a frequency of the disturbing magnetic field and a frequency of the second disturbing magnetic field are equal to each other, a phase of the disturbing magnetic field and a phase of the second disturbing magnetic field are the same as each other and, in addition, intensity of the disturbing magnetic field and intensity of the second disturbing magnetic field are equal to each other and thus the disturbing magnetic field and the second disturbing magnetic field are balanced with each other. Therefore, a differential signal between an output signal of the detection coil 62 and an output signal of the detection coil 63 becomes a signal in a sine wave shape which is varied with a constant period. Further, even when ambient temperature of the disturbing magnetic field generation means 10 is varied, an amplitude of the differential signal when a skimming magnetic head 80 is not attached to a front side of the card reader 1 can be made constant and small. Accordingly, a threshold value for a differential signal can be set appropriately for determining whether a skimming magnetic head 80 is attached to a front side of the card reader 1 or not. As a result, it is capable of detecting with a high degree of accuracy whether a skimming magnetic head 80 is attached to a front side of the card reader 1 or not based on an amplitude of the differential signal.

In this modified embodiment, it may be structured that a winding direction of the detection coil 62 and a winding direction of the detection coil 63 are set to be the same as each other. In this case, electric currents are supplied to the coils 34 and 35 so that, when the disturbing magnetic field begins to be generated so that the magnetic flux line "ML1" is directed from the first end face 31a toward the second end face 31b, the second disturbing magnetic field begins to be generated so that the magnetic flux line "ML2" is directed from the third end face 31c toward the fourth end face 31d and that, when the disturbing magnetic field begins to be generated in the direction from the second end face 31b toward the first end face 31a, the second disturbing magnetic field begins to be generated in the direction from the fourth end face 31d toward the third end face 31c. In other words, in this case, a phase of the disturbing magnetic field and a phase of the second disturbing magnetic field are set to be opposite to each other. In other words, in this case, a phase of the disturbing magnetic field and a phase of the second disturbing magnetic field are shifted by 180° from each other.

Also in this case, a differential signal between an output signal of the detection coil 62 and an output signal of the detection coil 63 becomes a signal in a sine wave shape varying with a constant period. Further, even when ambient temperature of the disturbing magnetic field generation means 10 is varied, an amplitude of the differential signal when a skimming magnetic head 80 is not attached to a front side of the card reader 1 can be made constant and small. Further, according to the examinations of the present inventors, in comparison with a case that a winding direction of the detection coil 62 and a winding direction of the detection coil 63 are opposite to each other and a phase of the disturbing magnetic field and a phase of the second disturbing magnetic field are the same as each other, a high degree of detection sensitivity can be attained by the detection coils 62 and 63 in a case that a winding direction of the detection coil 62 and a winding direction of the detection coil 63 are the same as each other and a phase of the disturbing magnetic field and a phase of the second disturbing magnetic field are opposite to each other. Therefore, in this case, it is capable of detecting with a further high degree of accuracy whether a skimming magnetic head 80 is attached to a front side of the card reader 1 or not.

In this modified embodiment, the detection coil 62 and the detection coil 63 may be connected in parallel with the detection circuit 65. In this case, the detection circuit 65 creates a differential signal between an output signal of the detection coil 62 and an output signal of the detection coil 63. Further, in this modified embodiment, the detection coil 62 or the detection coil 63 may be wound around a portion of the connecting core portion 31j between the second core portion 31f and the third core portion 31g. Further, in this modified embodiment, a frequency of the disturbing magnetic field and a frequency of the second disturbing magnetic field may be different from each other, a phase of the disturbing magnetic field and a phase of the second disturbing magnetic field may be different from each other, and intensity of the disturbing magnetic field and intensity of the second disturbing magnetic field may be different from each other. Further, in this modified embodiment, the magnetic flux line "ML2" may cross a position where a magnetic stripe 2a is passed when a card 2 is inserted. Further, in the modified embodiment shown in FIGS. 4 and 5, the disturbing magnetic field generation device 10 may be provided with a detection coil configured to detect a variation of the disturbing magnetic field generated by supplying an AC power source to the coil 12 and a second detection coil configured to detect a variation of the second disturbing magnetic field generated by supplying an AC power source to the coil 22.

Other Embodiments

Although the present invention has been shown and described with reference to a specific embodiment, various changes and modifications will be apparent to those skilled in the art from the teachings herein.

Figure 12A:
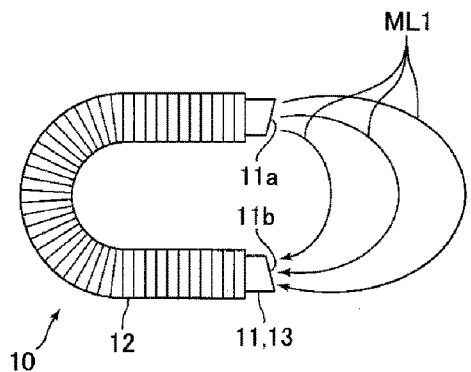
FIGS. 12(A), 12(B) and 12(C) are explanatory schematic plan view showing a structure of a core part in accordance with another embodiment of the present invention.
Figure 12B:
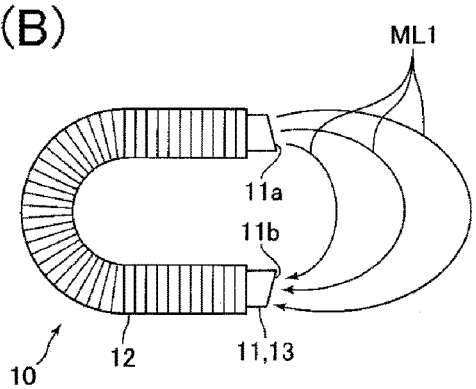

In the embodiments described above, the one end face 11a and the other end face 11b of the core 11 are disposed on substantially the same face. However, the present invention is not limited to this embodiment. For example, the one end face 11a and the other end face 11b may be disposed at positions displaced from each other in the front and rear direction. Further, in the embodiments described above, the one end face 11a and the other end face 11b are substantially parallel to the "Y-Z" plane. However, it is sufficient that the one end face 11a and the other end face 11b are disposed so as to face substantially a front side and, as shown in FIG. 12(A), they may be inclined with respect to the "Y-Z" plane so as to go toward a rear side as going toward an inner side in the right and left direction or, as shown in FIG. 12(B), they may be inclined with respect to the "Y-Z" plane so as to go toward a rear side as going toward an outer side in the right and left direction. Also in these cases, the one end face 11a and the other end face 11b are directed toward substantially a front side and thus, when an AC power source is supplied to the coil 12, a disturbing magnetic field is generated in which the magnetic flux line "ML1" directed from the one end face 11a toward the other end face 11b and the magnetic flux line "ML" directed from the other end face 11b toward the one end face 11a are periodically changed and the magnetic flux line "ML1" crosses a position where a magnetic stripe 2a is passed when a card 2 is inserted, Similarly, the one end face 21a and the other end face 21b of the core 21 shown in FIGS. 4 and 5 may be displaced from each other in the front and rear direction. Further, when the one end face 21a and the other end face 21b are disposed so as to face substantially a front side, they may be inclined with respect to the "Y-Z" plane. Further, the first end face 31a, the second end face 31b, the third end face 31c and the fourth end face 31d shown in FIGS. 6, 7 and 10 may be displaced from each other in the front and rear direction. Further, the first end face 31a, the second end face 31b, the third end face 31c and the fourth end face 31d may be inclined with respect to the "Y-Z" plane when they are disposed so as to face substantially a front side.

Figure 12C:
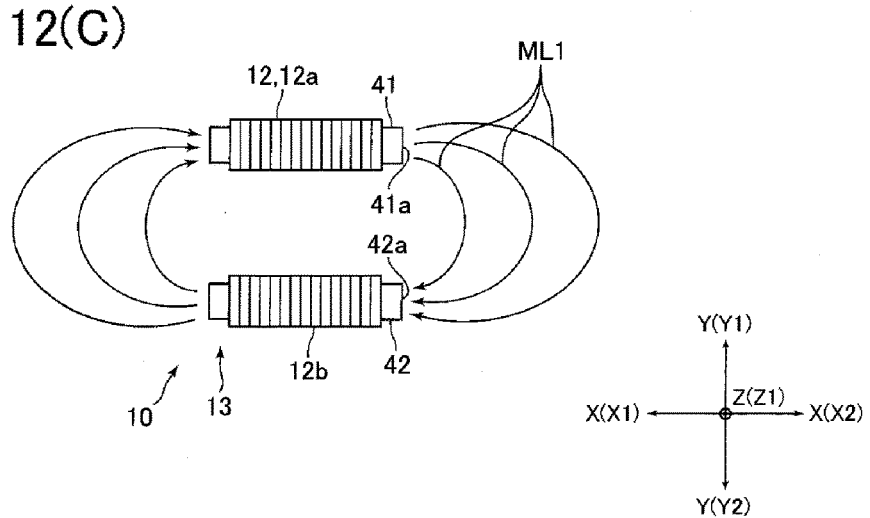

In the embodiments described above, the core part 13 of the disturbing magnetic field generation means 10 is structured of one core 11. However, the present invention is not limited to this embodiment. For example, as shown in FIG. 12(C), the core part 13 may be structured of two cores 41 and 42 in a bar shape which are disposed with the front and rear direction as their longitudinal directions when viewed in the upper and lower direction. In other words, instead of using the core 11, two cores 41 and 42 separately formed from each other may be disposed. In this case, the coil 12 is wound around the cores 41 and 42 and a winding direction of a coil part 12a which is a portion of the coil 12 wound around the core 41 and a winding direction of a coil part 12b which is a portion of the coil 12 wound around the core 42 are opposite to each other. Further, when an AC power source is supplied to the coil 12, a disturbing magnetic field is generated in which the magnetic flux line "ML1" directed from a front end face 41a of the core 41 toward a front end face 42a of the core 42 and the magnetic flux line "ML1" directed from the front end face 42a toward the front end face 41a are periodically changed. In this case, the front end face 41a is a first end face and the front end face 42a is a second end face.

Similarly, instead of using the core 21 shown in FIGS. 4 and 5, two cores formed separately from each other may be disposed. Further, instead of the core 31 shown in FIG. 6, four cores separately formed from each other around which the coils 34 and 35 are wound may be disposed and, instead of the core 31 shown in FIG. 7, three cores separately formed from each other around which the coils 34 and 35 are wound may be disposed.

In the modified embodiment shown in FIGS. 4 and 5, the disturbing magnetic field generation means 10 includes two cores 11 and 21 but the disturbing magnetic field generation means 10 may include three or more cores. Further, in the modified embodiment shown in FIG. 6, the core 31 is provided with two pairs of core portions, i.e., a pair of the first core portion 31e and the second core portion 31f, and a pair of the third core portion 31g and the fourth core portion 31h. However, the core 31 may be provided with three or more pairs of core portions.

In the embodiments described above, a magnetic stripe 2a is formed on a rear face of a card 2. However, a magnetic stripe 2a may be formed on a front face of a card 2 or a magnetic stripe 2a may be formed on both faces of a rear face and a front face of a card 2. Further, in the embodiments described above, the card reader 1 is a card conveyance type card reader provided with the drive roller 8 and the pad roller 9. However, a card reader to which the structure of at least an embodiment of the present invention is applicable may be a manual type card reader in which reading and recording of magnetic data are performed while a card 2 is manually moved by a user. For example, a card reader to which the structure of at least an embodiment of the present invention is applied may be a so-called dip-type card reader in which reading and recording of magnetic data are performed when a card 2 is inserted into the card reader or when a card 2 is drawn out from the card reader.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A card reader for use with a card having a magnetic stripe, the card reader comprising:
   a card insertion port into which the card is inserted;
   a card passage where the card is passed; and
   a disturbing magnetic field generator structured to generate a magnetic field for disturbing fraudulent reading of magnetic data recorded in the magnetic stripe, the disturbing magnetic field generator comprising:
      a core part comprising at least one core formed of magnetic material; and
      a disturbing magnetic field generation coil wound around the core;
   wherein when an inserting direction side of the card to the card insertion port which is one side of a passing direction of the card is referred to as a rear side and an ejecting direction of the card from the card insertion port which is the other side of the passing direction of the card is referred to as a front side, the core part comprises a first end face and a second end face which are disposed so as to face substantially the front side;
   wherein the disturbing magnetic field generator is structured to generate a disturbing magnetic field in which a direction of a magnetic flux line is changed into a direction from the first end face toward the second end face and a direction from the second end face toward the first end face;
   wherein the direction of the magnetic flux line of the disturbing magnetic field going out from one of the first end face and the second end face and the direction entering into the other of the first end face and the second end face are substantially parallel to the passing direction of the card; and
   wherein in a width direction of the card perpendicular to the passing direction of the card and a thickness direction of the card, the magnetic flux line of the disturbing magnetic field crosses a position where the magnetic stripe is passed when the card is inserted.

2. The card reader according to claim 1, wherein the first end face and the second end face are formed in one common core.

3. The card reader according to claim 2, wherein
   the core part comprises a first core formed with the first end face and the second end face and a second core formed with a third end face and a fourth end face which are disposed so as to face substantially the front side at positions displaced from the first end face and the second end face in the width direction of the card,
   the first core and the second core are disposed so as to interpose the card passage therebetween in the thickness direction of the card,
   the disturbing magnetic field generator is structured to generate a second disturbing magnetic field in which a direction of a magnetic flux line is changed into a direction from the third end face toward the fourth end face and a direction from the fourth end face toward the third end face,
   a direction of the magnetic flux line of the second disturbing magnetic field going out from one of the third end face and the fourth end face and a direction entering into the other of the third end face and the fourth end face are substantially parallel to the passing direction of the card, and
   the first end face, the second end face, the third end face and the fourth end face are disposed so that the disturbing magnetic field and the second disturbing magnetic field are overlapped with each other on the front side with respect to the card insertion port.

4. The card reader according to claim 2, wherein the disturbing magnetic field generator comprises a detection coil which is wound around the core and is configured to detect a variation of the disturbing magnetic field.

5. The card reader according to claim 1, wherein
the core part comprises a third end face and a fourth end face which are disposed so as to face substantially the front side at positions displaced from the first end face and the second end face in the width direction of the card,
the disturbing magnetic field generator is structured to generate a second disturbing magnetic field in which a direction of a magnetic flux line is changed into a direction from the third end face toward the fourth end face and a direction from the fourth end face toward the third end face,
a direction of the magnetic flux line of the second disturbing magnetic field going out from one of the third end face and the fourth end face and a direction entering into the other of the third end face and the fourth end face are substantially parallel to the passing direction of the card, and
the first end face, the second end face, the third end face and the fourth end face are disposed so that the disturbing magnetic field and the second disturbing magnetic field are overlapped with each other on the front side with respect to the card insertion port.

6. The card reader according to claim 5, wherein
the core part comprises a first core formed with the first end face and the second end face and a second core formed with the third end face and the fourth end face as the core, and
the first core and the second core are disposed so as to interpose the card passage therebetween in the thickness direction of the card.

7. The card reader according to claim 6, wherein
the direction of the magnetic flux line of the disturbing magnetic field is periodically changed into the direction from the first end face toward the second end face and the direction from the second end face toward the first end face, and
the direction of the magnetic flux line of the second disturbing magnetic field is periodically changed into the direction from the third end face toward the fourth end face and the direction from the fourth end face toward the third end face.

8. The card reader according to claim 5, wherein the first end face, the second end face, the third end face and the fourth end face are formed in one common core.

9. The card reader according to claim 8, wherein
the direction of the magnetic flux line of the disturbing magnetic field is periodically changed into the direction from the first end face toward the second end face and the direction from the second end face toward the first end face, and
the direction of the magnetic flux line of the second disturbing magnetic field is periodically changed into the direction from the third end face toward the fourth end face and the direction from the fourth end face toward the third end face.

10. The card reader according to claim 9, wherein the disturbing magnetic field generator comprises a detection coil, which is wound around the core and is configured to detect a variation of the disturbing magnetic field, and a second detection coil which is wound around the core and is configured to detect a variation of the second disturbing magnetic field.

11. The card reader according to claim 5, wherein
the direction of the magnetic flux line of the disturbing magnetic field is periodically changed into the direction from the first end face toward the second end face and the direction from the second end face toward the first end face, and
the direction of the magnetic flux line of the second disturbing magnetic field is periodically changed into the direction from the third end face toward the fourth end face and the direction from the fourth end face toward the third end face.

12. The card reader according to claim 5, wherein the disturbing magnetic field generator comprises a detection coil, which is wound around the core and is configured to detect a variation of the disturbing magnetic field, and a second detection coil which is wound around the core and is configured to detect a variation of the second disturbing magnetic field.

13. The card reader according to claim 12, wherein
the direction of the magnetic flux line of the disturbing magnetic field is periodically changed into the direction from the first end face toward the second end face and the direction from the second end face toward the first end face,
the direction of the magnetic flux line of the second disturbing magnetic field is periodically changed into the direction from the third end face toward the fourth end face and the direction from the fourth end face toward the third end face,
a changing period of the direction of the magnetic flux line of the disturbing magnetic field and a changing period of the direction of the magnetic flux line of the second disturbing magnetic field are set to be equal to each other,
a phase of the disturbing magnetic field and a phase of the second disturbing magnetic field are set to be the same as each other or opposite to each other, and
intensity of the disturbing magnetic field and intensity of the second disturbing magnetic field are set to be equal to each other.

14. The card reader according to claim 1, further comprising a card insertion part which is formed with the card insertion port and is formed in a hollow shape,
wherein the core part and the disturbing magnetic field generation coil are disposed in an inside of the card insertion part.

15. The card reader according to claim 14, wherein
the core part comprises a third end face and a fourth end face which are disposed so as to face substantially the front side at positions displaced from the first end face and the second end face in the width direction of the card,
the disturbing magnetic field generator is structured to generate a second disturbing magnetic field in which a direction of a magnetic flux line is changed into a direction from the third end face toward the fourth end face and a direction from the fourth end face toward the third end face,
a direction of the magnetic flux line of the second disturbing magnetic field going out from one of the third end face and the fourth end face and a direction entering into the other of the third end face and the fourth end face are substantially parallel to the passing direction of the card, and
the first end face, the second end face, the third end face and the fourth end face are disposed so that the disturbing magnetic field and the second disturbing magnetic field are overlapped with each other on the front side with respect to the card insertion port.

16. The card reader according to claim 1, wherein the disturbing magnetic field generator comprises a detection coil which is wound around the core and is configured to detect a variation of the disturbing magnetic field.

* * * * *